United States Patent
Robinson et al.

(10) Patent No.: US 8,164,670 B2
(45) Date of Patent: Apr. 24, 2012

(54) REMOTE STATUS MONITOR FOR HIGH SPEED VIDEO CAMERA

(75) Inventors: Christopher Paul Robinson, Essex (GB); Timothy Nicholas Dammery, Essex (GB); Nicki John Paris, Essex (GB)

(73) Assignee: Keymed (Medical & Industrial Equipment) Limited (GB)

( * ) Notice: Subject to any disclaimer, the term of this patent is extended or adjusted under 35 U.S.C. 154(b) by 678 days.

(21) Appl. No.: 12/247,256

(22) Filed: Oct. 8, 2008

(65) Prior Publication Data

US 2009/0096881 A1  Apr. 16, 2009

(30) Foreign Application Priority Data

Oct. 8, 2007  (GB) .................... 0719631.4

(51) Int. Cl.
*H04N 5/232* (2006.01)
*H04N 5/222* (2006.01)
(52) U.S. Cl. ................ 348/333.02; 348/211.4
(58) Field of Classification Search ............ 348/211.99, 348/211.4, 333.01, 333.02, 333.04, 373–376
See application file for complete search history.

(56) References Cited

U.S. PATENT DOCUMENTS

| | | | |
|---|---|---|---|
| 4,367,933 A | 1/1983 | Sahara | |
| 4,789,904 A | 12/1988 | Peterson | |
| 4,928,179 A * | 5/1990 | Takahashi et al. | 348/211.2 |
| 5,223,887 A | 6/1993 | Kobayashi et al. | |
| 6,374,054 B1 | 4/2002 | Schinner | |
| 6,657,548 B2 * | 12/2003 | Dai | 340/815.45 |
| 2007/0053678 A1 | 3/2007 | Yamane | |
| 2010/0328461 A1* | 12/2010 | Renkis | 348/143 |

OTHER PUBLICATIONS

Search Report under Section 17 for the corresponding GB 0719631.4 application (dated Jul. 28, 2008).
Sony CCU-TX50/50P Camera Control Unit Operating Instructions, p. 5. Found ay www.conceptorg.com/techlibrary/VideoControl/file_info/download.php?file=Sony%20CCU-TX50_Manual.pdf Downloaded Jul. 24, 2008.
European Search Report dated Mar. 29, 2010 for Application No. EP 08 25 3270.

* cited by examiner

*Primary Examiner* — Timothy J Henn
(74) *Attorney, Agent, or Firm* — Smith, Gambrell & Russell, LLP

(57) ABSTRACT

A high speed video camera 10 comprises a camera body 20 and a camera lens 30. The rear of the camera body 20 is formed with a handle 40 adjacent to rear face 50 of the camera. Mounted upon or within the handle 40 is a plurality of status LED 60, preferably in a horizontal row. A camera micro processor controls an LED driver which drives the status LED 60 commonly but independently. This permits various different patterns or sequences to be generated, in turn to provide an indication, to a remote user, a plurality of different camera statuses.

5 Claims, 3 Drawing Sheets

REMOTE STATUS MONITOR FOR HIGH SPEED VIDEO CAMERA

FIELD OF THE INVENTION

This invention relates to a remote status monitor for a high speed video camera.

BACKGROUND OF THE INVENTION

High speed video cameras are widely used for product testing, including vehicle impact testing and ballistics testing. In applications such as this the camera must be operated remotely, since an operator is not permitted in the area of the test for safety reasons. Typically, the operator may be required to remain in a safety cell with reinforced windows, so that he can see the test in progress and yet remain protected against flying debris.

High speed cameras typically include some form of textual or graphical menu display device. This display device is able to provide confirmation of the correct operation of the high speed camera, However, whilst inside the safety cell, some distance from the camera, the operator is unable to view that display device and hence cannot have confidence that the camera is operating correctly.

Relocating the display device away from the camera, and/or providing a secondary display device, provides particular challenges in the environments that high speed cameras are typically operated. For example, the use of wireless (e.g. radio) communication between the camera and a remote display device may be prohibited whereas the use of a (wired) electrical connection between the camera and a remote display device is often undesirable in view of the potential for damage by flying debris.

SUMMARY OF THE INVENTION

Against this background, in accordance with the first aspect of the present invention, there is provided a high speed video camera, comprising a remote status indicator including a plurality of illuminatable lamps; and a controller, arranged to control, collectively, the illumination of the plurality of illuminatable lamps so that they display to the user of the camera, at a location remote from the camera, a plurality of different patterns or sequences representative of a respective plurality of different statuses of the camera.

Thus, a camera user is able to see from a distance, at any given moment, the status of the camera (for example, if the camera is on, if it is recording, if a trigger signal has been received, if the camera has a fault and so forth) without the need for a wired or wireless link to a remote visual display unit or the like. By employing a plurality of illuminatable lamps, which can be illuminated in different sequences, such as different flashing sequences or running lights, it is possible to provide, in principle, multiple different patterns which can provide remote indication of multiple different camera statuses.

In a preferred embodiment, the illuminatable lamps may be LEDs which can be illuminated so as to display different colours and/or to flash at different repeat rates, for example.

In a further preferred embodiment, the camera may have or be connectable to a video image display unit. In that case, the controller of the camera may be further configured to cause an image or representation of the status of the plurality of illuminatable lamps to be captured or generated for display along with, and synchronized to, live video images upon the video image display unit. This provides further confidence to the user, if the controller is visible to him, during live recording video images, that the camera status at each stage during the image capture is correct. It would also be feasible to synchronize the image or representation of the status of the plurality of illuminatable lamps to captured video images so that, during playback, the correct camera status during each stage of the image capture can be confirmed, though such a technique is of limited benefit since the fact that suitable images are being played back is normally sufficient confirmation of successful video recording.

In accordance with a second aspect of the present invention, there is provided a high speed video camera comprising a remote status indicator having at least one illuminatable light and a controller arranged to control the illumination of the or each illuminatable light so as to display to a user, at a location remote from the high speed video camera, at least three different patterns or sequences of illumination representative of at least three corresponding different modes of operation of the high speed video camera.

In accordance with a third aspect of the present invention, there is provided a high speed video camera comprising a remote status indicator having at least one illuminatable light and a controller arranged to control the illumination of the or each illuminatable light so as to display to a user, at a location remote from the high speed video camera, multiple different illumination modes representative of a respective plurality of different high speed video camera recording modes during a high speed video recording sequence.

In accordance with still a further aspect of the present invention, there is provided a method of indicating the status of a high speed video camera, comprising the steps of providing a plurality of illuminatable lamps upon or immediately adjacent a body of the high speed video camera, each illuminatable lamp being visible from a distance when illuminated; and illuminating the lamps in a plurality of different sequences or patterns, each representative of a respective one of a plurality of different camera statuses.

Further advantageous features of the present invention will become apparent from the following specific description of a preferred embodiment and from the appended claims.

BRIEF DESCRIPTION OF THE DRAWINGS

The invention may be put into practice in a number of ways, and a specific embodiment will now be described by way of example only and with reference to the accompanying figures in which.

DETAILED DESCRIPTION OF THE PREFERRED EMBODIMENT

Figure 1:
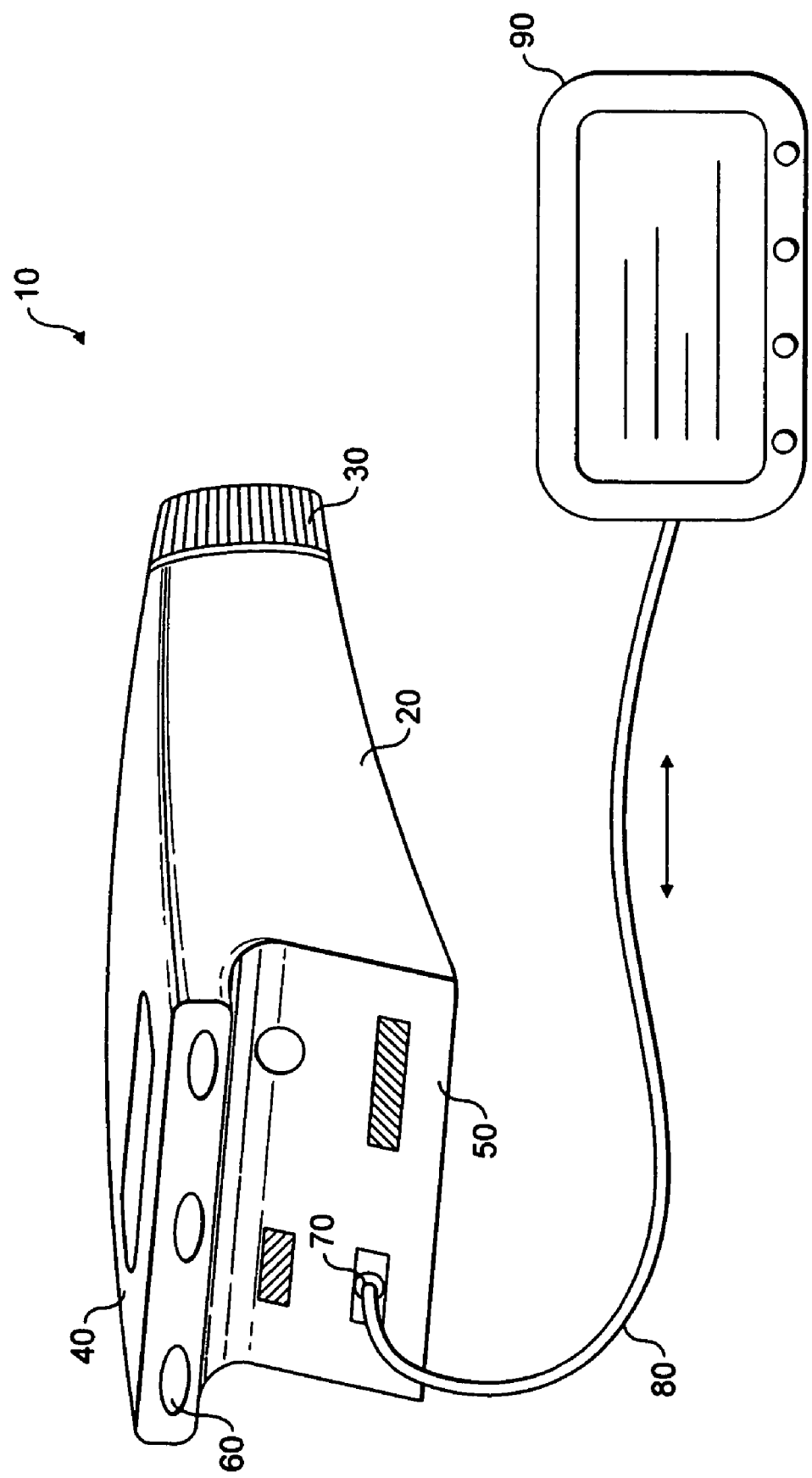
FIG. 1 shows schematic perspective view of a high speed video camera in accordance with an embodiment of the present invention, and having a plurality of status LEDs.

Referring first to FIG. 1, a perspective schematic view of a high speed video camera 10 embodying the present invention is shown. The camera 10 comprises a camera body 20 and a camera lens 30. The rear of the camera body 20 is formed with a handle 40 adjacent a rear face 50 of the camera. Mounted upon or within the handle 40 is a plurality of status LEDs 60; in the embodiment shown in FIG. 1, three LEDs are shown in a horizontal row.

The rear face 50 of the camera 10 is provided with a plurality of jacks and sockets to allow input and output of power and data to the camera. As shown in FIG. 1, a camera display unit (CDU) 90 may be connected to a camera socket 70 provided on the rear face 50 of the camera 10, using a connecting cable 80. The connection between the camera 1) and the CDU 90 may be bidirectional.

The status LEDs 60 are driven by an LED driver (not shown in FIG. 1) which is under the control of a camera microprocessor (also not shown in FIG. 1). The purpose of the status LEDs is to provide a visual indication to a user of the camera, when that user is at a distance from the camera, of the current status of the camera. Because there are a multiplicity of LEDs 60, which are commonly but independently driven by the LED driver, a large number of different patterns or sequences can be generated so that a commensurate large number of different camera statuses can be represented. For example, each LED may be illuminated so as to appear as one of a plurality of different colours (red, green, blue etc), depending upon how it is driven by the LED driver. Each LED may be illuminated in a number of different on/off sequences (constant on, constant off, short flashing on, short flashing off, fast fade, slow fade etc). Moreover, because the three LEDs are commonly driven by the LED driver, an overall display pattern can be achieved, such as "running lights" from left to right, simultaneous flashing of all three lights, and so forth.

The manner of operation of the status LEDs 60 during use of the camera 10 may more readily understood by way of example.

One of the well known uses of a high speed video camera is in the recording of images of automotive impact using an automotive sled. Here, a part (or most) of a car is mounted upon a sled which is in turn mounted upon rails. The sled is accelerated from rest to typically 50 kilometers per hour and is then rapidly decelerated by impact against some form of end. High speed video camera are mounted in the test room around the end of the sled tracks, focused upon the point where the item under test will be at the moment of impact/deceleration. Usually, multiple cameras are employed and are mounted to the left, to the right, above and sometimes underneath the sled. Often, cameras may also be mounted upon the sled itself, focused upon specific areas of interest.

When the test setup is complete, the sled is towed to the starting point and all cameras are set to record mode. For safety reasons, all entrances to the area are then locked and the area is cleared of personnel. Any personnel involved or observing are located inside safe rooms, viewing through safety glass. Usually, to enable the firing button for the sled, all doors must be locked.

Thus, at the moment when the operator is ready to press the firing button, he is unable to check the operational status of any of the cameras in the room. Of course, it is to be expected that the cameras will have been checked upon setup of the test but local confirmation by an operator that the cameras are operational during setup can provide no guarantee that the cameras are still operational when the test room has been locked immediately prior to test commencement. Each test may cost up to hundreds of thousands of Dollars and so it is extremely desirable that the test operator should have confidence that the cameras are operational at the moment when he presses the firing button.

The status LEDs 60 provide this confirmation. In the present example, the LEDs 60 are controlled by the microprocessor of the camera 10 so as to provide sweeping green lights (left to right to left). Even from a distance and in a blast proof room through safety glass, it is thus possible to check at a glance that all of the cameras are ready to record. Should any of the cameras not be ready to record, due to an error, then the microprocessor system in camera 10 will cause the LED driver to drive the three LEDs 60 together as synchronized rapidly flashing red lights. If any of the cameras are indicating an error by flashing red lights, then the operator can abort the test sequence prior to firing the sled, unlock the doors of the room and go to the camera to find/fix the fault before commencing the firing sequence once more.

Once the firing button has been pressed (on the basis that all of the cameras are showing running green lights indicative of ready status), the impact test itself occurs in the space of a few seconds. Once the firing button has been pressed, this sends a trigger signal to each camera and the operator is able to have confidence that the cameras have responded to that trigger signal because the status LEDs 60 change from running green lights to flashing green lights, with just the outer two LEDs 60 flashing alternately. The middle LED, in particular, is extinguished during this phase. Although there is little time, knowing that one or more of the cameras has not correctly received the automatic trigger signal may allow the operator to make some adjustments to ensure that the information which is recorded by the correctly operating cameras is optimal.

Finally, when the trigger time out has occurred (that is, when the maximum camera memory time has been reached) the status LEDs 60 will change again so that each is illuminated with a steady red light.

Thus, at each stage of the test, the operator is able immediately to determine, remotely, the status of the camera and so have confidence that each camera is operating as it should.

It will of course be appreciated that the above example is merely illustrative of the patterns and sequences that might be provided, during the specific example of collision test. Because the LEDs 60 can be driven in a multiplicity of different colours and patterns both individually and collectively, an extremely large number of different permutations of patterns, sequences and colours may be provided to represent a very large number of different camera statuses. For example, in Record on Command (ROC) or Burst Record on Command (BROC) the LEDs may be illuminated in yellow rather than green. During boot-up of the camera, the status LEDs 60 may be blue when illuminated and sweep from left to right, for example. Where the camera displays a warning message on the CDU 90 the status LEDs may provide a periodic brief white blink. During camera power off (either following an instruction to power down by a user, or initiated by the camera itself due to a power loss) a blue/red flash extinguishing from right to left as the power out progresses may be displayed. Many other combinations of colours and patterns or sequences will be apparent to the skilled reader.

Figure 2:
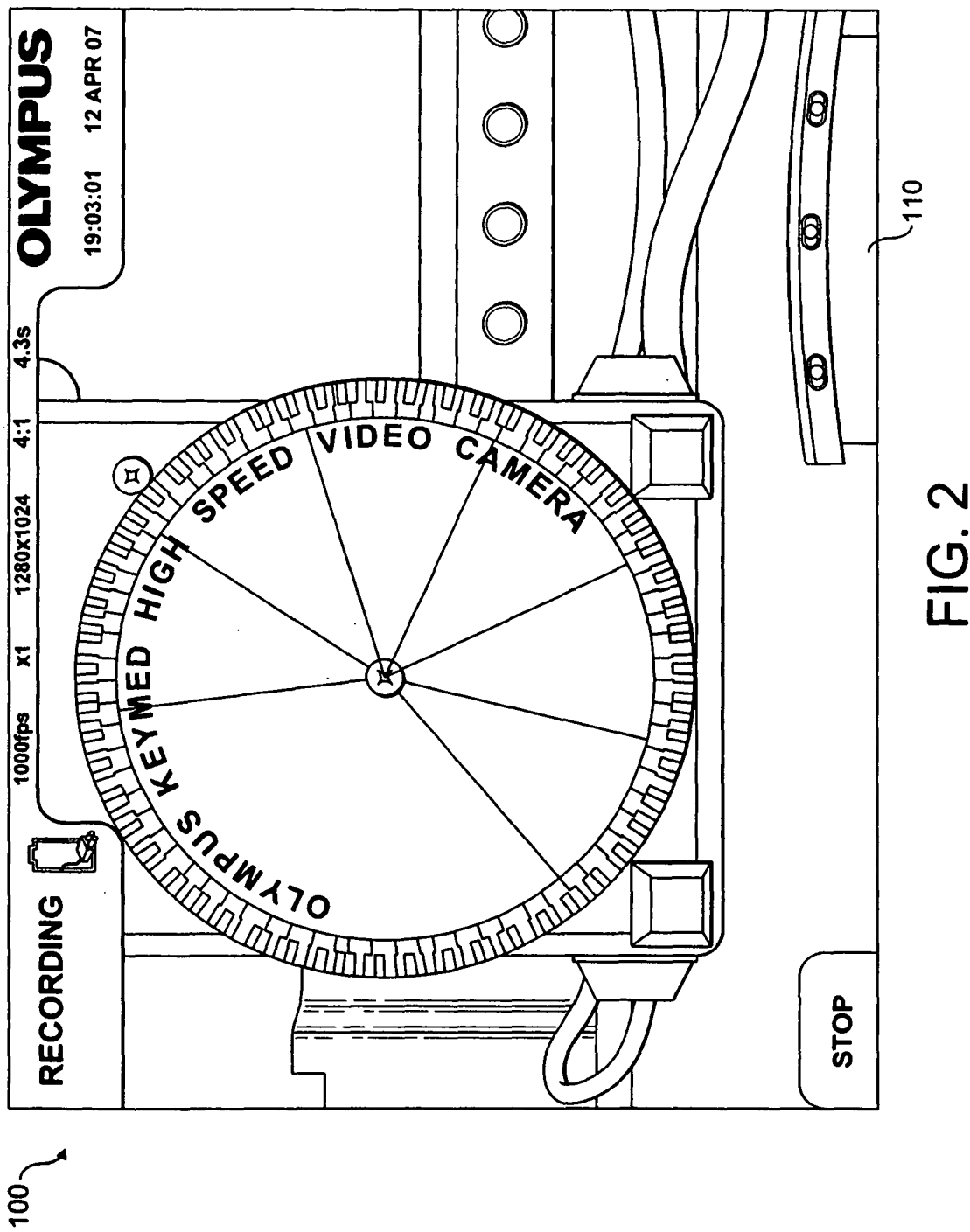
FIG. 2 shows an exemplary video frame displayed by the camera of FIG. 1, with a superimposed image of the status LEDs.

As explained above in connection with FIG. 1, the camera 10 may incorporate or be locally connected to a CDU 90. In accordance with a further preferred feature of the present invention, the camera may add a graphical representation or a photo-realistic rendition of the status LEDs 60 onto the video image display of the camera, by overlaying the typical representation onto each frame in real time as they are displayed. FIG. 2 shows an exemplary video frame 100, with the status LEDs 60 super imposed onto that video frame 100 at the lower right hand part of the frame as indicated at reference numeral 110 in FIG. 2.

Figure 3:
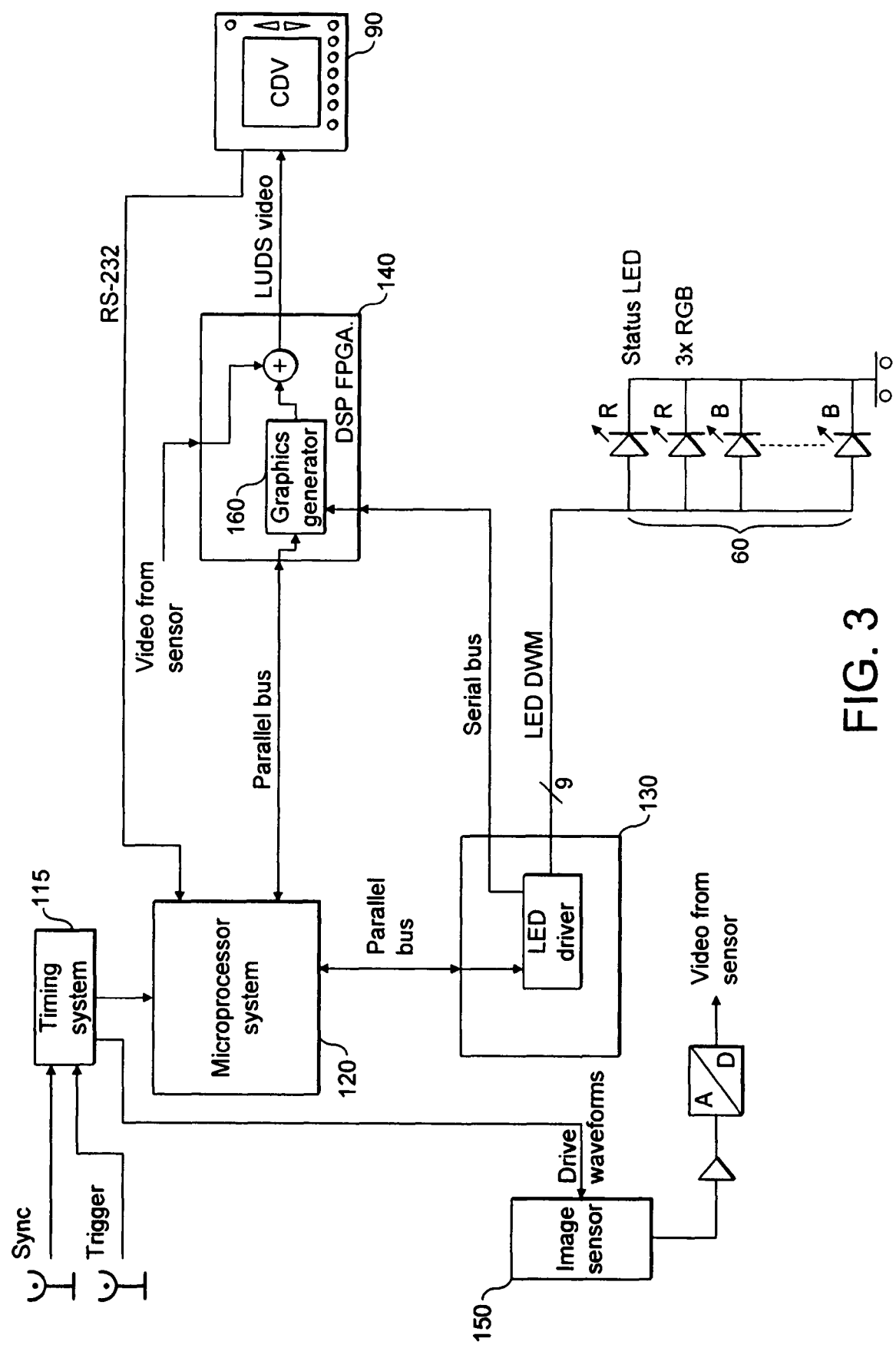
FIG. 3 shows a block diagram of the logical arrangement of components of the camera of FIG. 1 for driving the status LEDs and interfacing with displayed images.

Turning finally to FIG. 3, a schematic block diagram of the status LEDs 60, the CDU 90, and the relevant components of the camera 10 to drive each, is shown.

The system is controlled by a camera microprocessor 120 which is in communication with an LED driver 130 for driving the status LEDs 60, and also in communication with a digital signal processor for carrying out the graphics generation and mixing with the video frames. Communication between each of the LED driver 130 and DSP 140 may be via a serial bus although, of course, a parallel bus would be equally suitable.

Sync and trigger inputs are received by a timing system 115. This provides an output to the microprocessor system 120 which in turn sends instructions to the LED driver 130. The LED driver 130 may then output a driver signal to the status LEDs as a pulse width modulated signal to create the desired sequence or pattern of flashing/stationary lights, in the desired colour.

The timing system 115 is also able to output a drive waveform signal to an image sensor 150. The output of that image sensor 150 is converted from analogue to digital. This "video from sensor" signal can be used as a first summing input to the DSP 140. The other summing input within the DSP 140 is from a graphics generator 160 which is in turn in communication with the microprocessor system 120 along the parallel bus. This arrangement permits graphics to be overlaid onto the video image.

Thus the output of the DSP 140 is a digital video signal with overlaid graphics, which is sent to the CDU 90 for display there. The CDU 90 may communicate back to the microprocessor system 120 directly along a serial (RS-232) bus.

The DSP 140 may be implemented as a field programmable gate array (FPGA) programmed in VHDL. The system is configurable by the onboard software built into the camera 10. Error detection may be asserted by that software or may be autonomously asserted by the error detection in the FPGA, which monitors activity on the camera control bus and interprets silence as a problem.

Although a specific embodiment has been described, it will be readily appreciated by the skilled person that various modifications can be envisaged. For example, although it is convenient to locate the status LEDs 60 upon the handle 40 of the camera body 20 it may be desirable additionally or alternatively to provide status LEDs 60 elsewhere. For example, a bump on the top of the camera would allow the status LEDs 60 if mounted there, to be visible from all around the camera, rather than just from the side or the rear. It is also, of course, unnecessary to limit the number of LEDs 60 to three and more LEDs may be desirable in certain circumstances. Likewise, the nature of the indicator is not itself critical to the present invention, although LEDs benefit from reliability, shockproofness, power efficiency, brightness, speed, availability and low cost.

The invention claimed is:

1. A high speed video camera comprising:
a remote status indicator including a plurality of illuminatable lamps; and
a controller arranged to control, collectively, the illumination of the plurality of illuminatable lamps so that they display to a user of the camera, at a location remote from the camera, a plurality of different patterns or sequences representative of a respective plurality of different statuses of the camera, wherein
each of the plurality of illuminatable lamps is a multicoloured lamp, capable of being illuminated in a plurality of different colours, and
the controller is further arranged to cause each of the plurality of multicoloured lamps to illuminate in a particular colour and in a particular sequence relative to the others of the plurality of lamps in the remote status indicator, in dependence upon the particular camera status to be indicated; and further comprising a video image display unit, the controller being further configured to cause an image or representation of the status of the plurality of illuminatable lamps to be captured or generated for display along with, and synchronized to, captured video images, upon the video image display unit, wherein the image or representation of the status of the plurality of illuminatable lamps is an image of the plurality of lamps.

2. The high speed video camera of claim 1, wherein the controller is arranged to control the illumination of the plurality of illuminatable lamps so that they display a plurality of different patterns or sequences each representative of one of a plurality of different modes of camera operation prior to, during and/or subsequent to the capture of one or more images by the high speed video camera.

3. The high speed video camera of claim 1, wherein the controller is arranged to cause the illuminatable lamps to be illuminated in at least two different patterns or sequences, when the controller determines or is instructed that the high speed video camera is in a respective two or more camera operation modes selected from the following camera operation mode list:

(a) the high speed video camera is determined to be ready to capture one or more images and no camera error is detected;

(b) the high speed video camera has been instructed that one or more images are to be captured but an images capture error is detected;

(c) the high speed video camera is determined to be ready to capture one or more images, or is in the process of capturing images, and a camera trigger signal is determined to have been successfully received; and (d) the high speed video camera is determined to have completed the process of capturing images.

4. The high speed video camera of claim 1, wherein the plurality, or at least one of the plurality of illuminatable lamps is a red/green/blue LED.

5. A method of indicating the status of a high speed video camera, wherein the high speed video camera comprises:

a remote status indicator including a plurality of illuminatable lamps; and a controller arranged to control, collectively, the illumination of the plurality of illuminatable lamps so that they display to a user of the camera, at a location remote from the camera, a plurality of different patterns or sequences representative of a respective plurality of different statuses of the camera, wherein each of the plurality of illuminatable lamps is a multicoloured lamp, capable of being illuminated in a plurality of different colours, and the controller is further arranged to cause each of the plurality of multicoloured lamps to illuminate in a particular colour and in a particular sequence relative to the others of the plurality of lamps in the remote status indicator, in dependence upon the particular camera status to be indicated; and further comprising a video image display unit, the controller being further configured to cause an image or representation of the status of the plurality of illuminatable lamps to be captured or generated for display along with, and synchronized to, captured video images, upon the video image display unit, wherein the image or representation of the status of the plurality of illuminatable lamps is an image of the plurality of lamps; and the method comprises the steps of:

providing the plurality of illuminatable lamps upon or immediately adjacent to the body of the high speed video camera each illuminatable lamp being visible from a distance when illuminated, wherein each illuminatable lamp of the plurality of lamps is a multicoloured lamp, capable of being illuminated in a plurality of different colours; and illuminating the lamps in a plurality of different sequences or patterns, each representative of a respective one of a plurality of different camera statuses;

wherein each lamp in the plurality of lamps is illuminated in a particular colour and in a particular sequence relative to the others of the plurality of lamps.

* * * * *